United States Patent [19]

Theroux et al.

[11] Patent Number: 5,057,988
[45] Date of Patent: Oct. 15, 1991

[54] MODULAR POWER SUPPLY

[75] Inventors: Robert L. Theroux, Holyoke; Fatemeh Abnoosi, East Longmeadow, both of Mass.

[73] Assignee: K and M Electronics, Inc., West Springfield, Mass.

[21] Appl. No.: 437,986

[22] Filed: Nov. 16, 1989

[51] Int. Cl.$^5$ .............................................. H02M 7/10
[52] U.S. Cl. ...................................... 363/59; 361/398; 357/72; 427/213.3; 427/213.31
[58] Field of Search ............... 363/59, 60, 61; 357/51, 357/52, 55, 72, 74, 75, 76, 80; 427/213.3, 213.31, 213.32, 213.33, 213.34, 213.35, 213.36; 361/398; 174/52.2

[56] References Cited

U.S. PATENT DOCUMENTS 3,814,989  6/1974  Tamkin .......................... 174/522 X
4,843,520  6/1989  Nakatani et al. ............... 361/398 X Primary Examiner—Steven L. Stephan
Assistant Examiner—Emanuel Todd Voeltz
Attorney, Agent, or Firm—Lahive & Cockfield

[57] ABSTRACT

Disclosed is a system comprising a plurality of networks, encapsulated in substantially electrically nonconductive materials and positioned interior to the outer surface of an encasement region. According to the invention, at least one outer surface of at least one of the encapsulated networks is complementary to, adjacent to, and in physical contact with at least one outer surface of at least one other of the encapsulated networks. Also disclosed is a method for constructing the system. In a preferred embodiment, the system is a toroidally shaped power supply whose modular structure facilitates ease of testing and assembly, affords considerable space savings, substantially reduces manufacturing waste costs, and eliminates a proven source of circuit failure.

10 Claims, 2 Drawing Sheets

MODULAR POWER SUPPLY

BACKGROUND

This invention relates to power supplies. In particular it relates to modular construction of power supplies.

By separating a power supply into functional circuit elements and fabricating and testing these elements prior to final assembly of the supply, a manufacturer can save on labor and material waste costs while also increasing reliability. A power supply circuit element that particularly lends itself to such modularization is a voltage multiplier.

A voltage multiplier is a circuit element that accepts a low level ac voltage as an input and yields a high level d.c. voltage as an output. Fabricating and testing miniaturized voltage multipliers has traditionally proved to be a very costly endeavor because miniature high voltage components, such as voltage multipliers, cannot be tested in free air. The close proximity of the low voltage input circuitry and the high voltage output circuitry causes destructive input-to-output arc-over to take place. Arc-over can only be avoided by completely immersing the multiplier in a substantially non-conductive material before powering its circuits.

A common solution to testing this problem is to fabricate the multiplier circuit, insert it into an isolated compartment (defined by rigid walls) in the power supply encasement where the multiplier is to be used, affix it into place by filling (or potting) the compartment with a substantially non-conductive compound, and then test the multiplier. This approach is very costly since if a multiplier proves to be defective upon testing, the entire power supply encasement must be discarded, thereby creating a substantial waste of labor and materials.

Voltage multipliers designed for use in toroidally shaped miniature power supplies have an additional fabrication problem. Generally, such multipliers are initially assembled on a planar, flexible circuit board. Each multiplier, prior to being affixed into the power supply encasement, must be bent into a cylindrical section so that its curvature substantially matches that of the interior surface of the toroidal power supply encasement. This enables the region that the multiplier occupies inside the encasement to be as small as possible. There is a risk that this bending will cause fragile interconnections in the multiplier circuitry to break. Often these failures are not detectable until the multiplier is tested after it is affixed within the power supply encasement, at which point the entire encasement must be discarded.

Another conventional approach is to bend the multiplier and then to submerse it in a non-conductive liquid during the testing phase. The multiplier, once tested, is then affixed into place as described above and retested. This approach also has substantial risk of waste because affixing the multiplier into place, even unaccompanied by bending, is often enough to cause fragile, exposed interconnections in the multiplier circuit to become detached. By the time these failures are discovered, the multiplier has once again been affixed within the encasement, thus requiring the encasement to be discarded.

Aside from waste costs incurred during the testing of the voltage multipliers, conventional approaches also suffer from reliability problems. In the prior art, once a potted circuit element, such as a voltage multiplier, has been affixed into an isolated compartment in a power supply encasement and tested, the remainder of the encasement is filled with circuitry, tested, and then filled with a similar non-conductive compound used in the multiplier compartment. Often only a frictional bond can be achieved between the walls which define the isolated compartments and the non-conductive compounds used to affix the power supply elements into place. Therefore, interfaces between the compounds and the walls of the compartments (where the multiplier and other like circuitry reside) have proven to be a source of moisture seepage, which may result in arc-over at the respective interfaces. The probability of failure due to moisture seeping into the power supply would be substantially reduced when these interfaces are eliminated.

In addition to reliability problems, the walls of the isolated compartments take up valuable space that could otherwise be used for circuitry.

Accordingly, it is the object of the present invention to provide an improved modular power supply. It is another object to provide an improved modular power supply whereby circuit elements, such as voltage multipliers, can be fabricated, encapsulated and then tested in free air prior to being installed into the power supply encasement, thereby substantially reducing the labor and material waste costs associated with the manufacturing of power supplies.

It is also an object of this invention to eliminate the need for well-defined, isolated compartments inside a power supply encasement, thereby eliminating interfaces that are a proven source of moisture seepage and circuit failure, and also providing a substantial space savings.

It is a further object of the invention to provide a modular power supply structure specifically for applications in toroidally shaped power supplies.

SUMMARY OF THE INVENTION

The present invention includes a power supply whose modular structure facilitates ease of testing and assembly, affords considerable space savings, substantially reduces manufacturing waste costs, and eliminates a proven source of circuit failure.

A power supply according to the invention, includes a power supply encasement region and (n) circuit networks, where (n) is an integer larger than one. Each network is distributed over a surface and positioned interior to the outer surface of the encasement region. Each network is encapsulated in a substantially electrically non-conductive material. All encapsulation materials are characterized by a non-friction based bonding affinity. At least one outer surface of each encapsulated network is complementary to, adjacent to, and in contact with at least one outer surface of another encapsulated network.

In a preferred embodiment there are two encapsulated networks. Both networks are distributed over cylindrical section surfaces, being non-intersecting and positioned interior to the outer surface of a toroidally shaped power supply encasement.

A method for fabricating a power supply embodying the features of this invention includes the steps of: (1) constructing the circuit networks and distributing the networks over surfaces; (2) encapsulating the networks; and (3) testing and then installing the networks into the power supply encasement.

The present invention is an improvement over the prior art discussed above in that it enables power supply circuit elements, such as voltage multipliers designed for use in toroidally shaped power supplies, to be fabricated, bent, encapsulated and tested prior to installation into a power supply encasement. In this way it provides for the discovery of defective circuit elements before it becomes necessary to discard the supply encasement. The present invention is also an improvement over prior art because it eliminates the need for previously used isolated compartments. By eliminating the isolated compartments, interfaces that have proven to be a source of moisture seepage and thus, circuit failure are also eliminated. Additionally, by eliminating the isolated compartments, the designer gains valuable space.

BRIEF DESCRIPTION OF THE DRAWINGS

The foregoing and other objects of this invention, the various features thereof, as well as the invention itself, may be more fully understood from the following description, together with the accompanying drawings.

DESCRIPTION OF THE ILLUSTRATED EMBODIMENT

Figure 1:
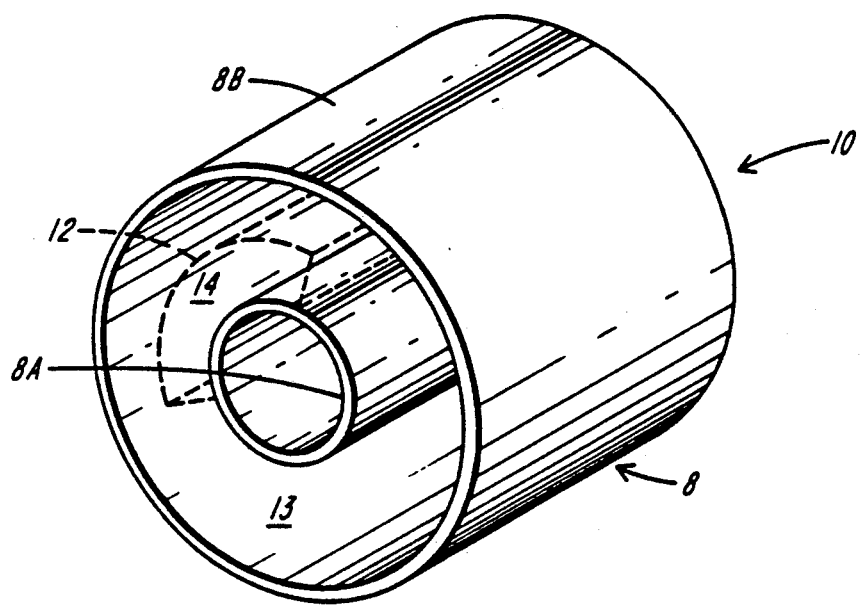
FIG. 1 shows a perspective view of a toroidal encasement adapted for a power supply of the present invention.
Figure 2:
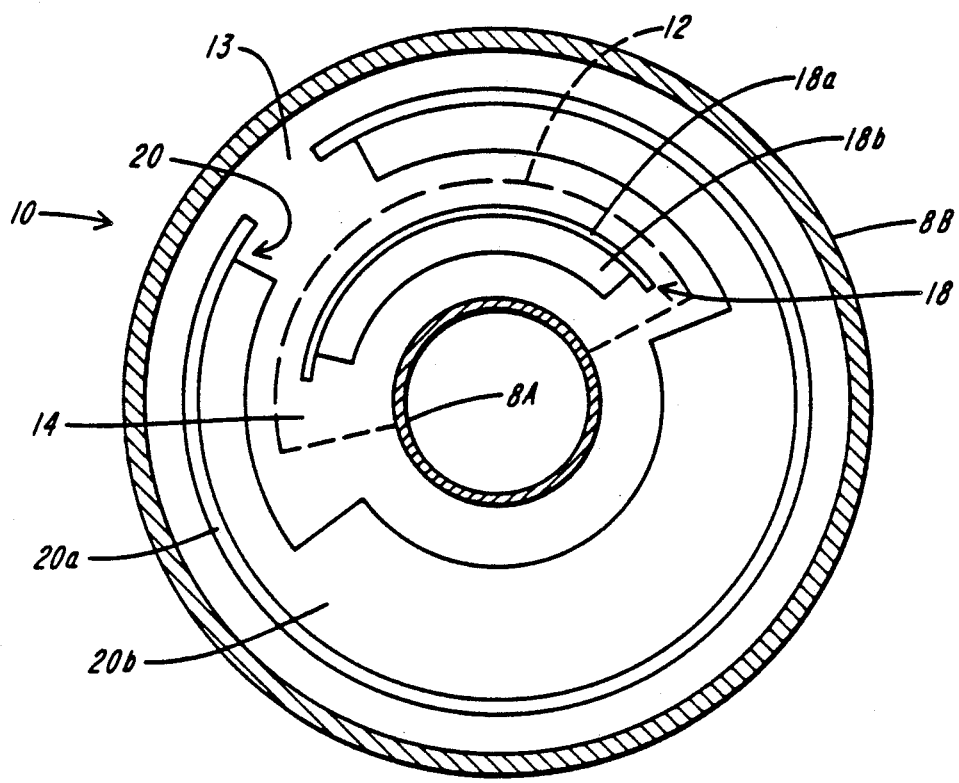
FIG. 2 shows an end view of an exemplary power supply in accordance with the present invention.
Figure 3:
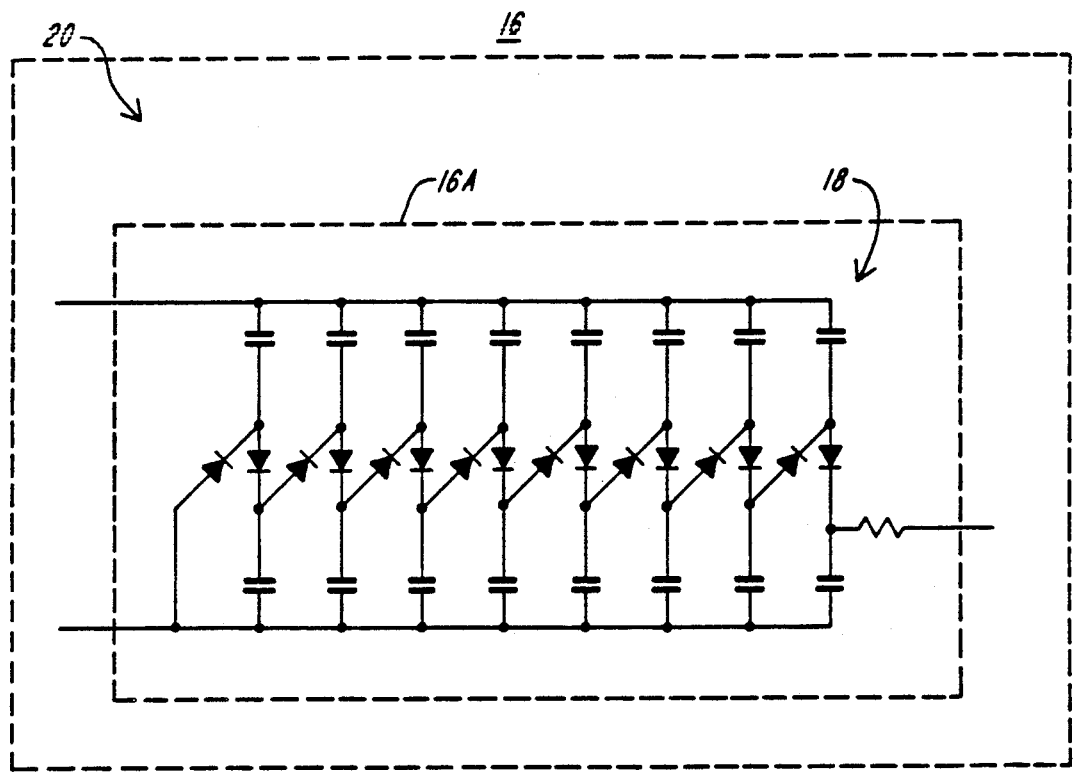
FIG. 3 shows, in schematic form, a circuit for the power supply of FIG. 2.

A toroidal shaped encasement 8 for a power supply of the present invention is shown in perspective view in FIG. 1. FIG. 2 shows an end view a power supply 10 of the present invention, where the circuit components of the power supply are positioned within the encasement 8. A schematic diagram of an exemplary circuit 16 for the power supply 10 is indicated in FIG. 3. That circuit 16 includes a multiplier network 18 (bounded by dashed line 16A in FIG. 3) and an additional network 20 (indicated generator, but without showing specific electrical circuit component symbols, outside dashed line 16A). In the present embodiment, networks 18 and 20 are mounted on flexible printed circuit boards 18a and 20a, respectively. The electrical circuit components on the those boards are represented in FIG. 2 by blocks 18b and 20b, respectively.

The toroidally shaped encasement 8 defines a toroidal interior region bounded by inner cylindrical wall 8A, outer cylindrical wall 8B, and bottom wall (not shown) which connects walls 8A and 8B in a coaxial configuration at the rear, as shown in FIG. 1. The annular front of the toroidal region is open.

Dashed line 12 in FIG. 1 divides the interior region into two separate regions 13 and 14. The region 14 is adapted to receive the multiplier network 18 and the region 13 is adapted to receive the network 20.

As noted above, FIG. 2 shows an end view of the power supply 10, with the networks 18 and 20 positioned within the respective regions 14 and 13. Each of networks 18 and 20 are encapsulated by substantially electrically non-conducting materials so that each of the resulting encapsulated networks completely fills the respective one of regions 14 and 13. As a consequence, an outer surface of encapsulated network 18 is complementary to, adjacent to, and in physical contact with, an outer surface of network 20.

Preferably at least the multiplier network 18 is encapsulated and tested prior to installation into region 14 of encasement 8. Once encapsulated network 18 is installed into power supply encasement 8. The network 20 may be positioned within region 13 and encapsulated in situ. The encapsulating materials for both networks are selected so that the outer complementary surfaces between networks 18 and 20 form non-frictional based bonds with each other. By way of example, the encapsulation material may be Isobond #24 used in conjunction with Hardner #22, manufactured by Isochem Resins Co., Lincoln, R.I.

A preferred method for assembling and installing network 18 and 20 into the toroidal encasement 8, is to construct the first and second networks 18 and 20, affixing the components of the first network 18 on the circuit board 18a and those of the second network 20 on the circuit board 20a. Next, the board 18a is formed into a cylindrical section and encapsulated in a substantially electrically non-conductive material, such as Isobond #24 used in conjunction with Hardner #22. In the illustrated embodiment, all lateral surfaces of the encapsulated network 18 have a predetermined (cylindrical) shape. Following encapsulation, network 18 is inserted into the region 14.

The circuit board 20a is then formed into a cylindrical section and positioned in region 13 adjacent to the encapsulated network 18. Networks 18 and 20 are then electrically connected. The region 13 is then filled with a substantially non-conductive material, such as Isobond #24 used in conjunction with Hardner #22, having a non-friction based bonding affinity with the material used to encapsulate network 18. The outer surface (adjacent to encapsulated network 18) forms a non-frictional based bond with at least one complementary lateral surface of the encapsulated network 18.

Figure 4:
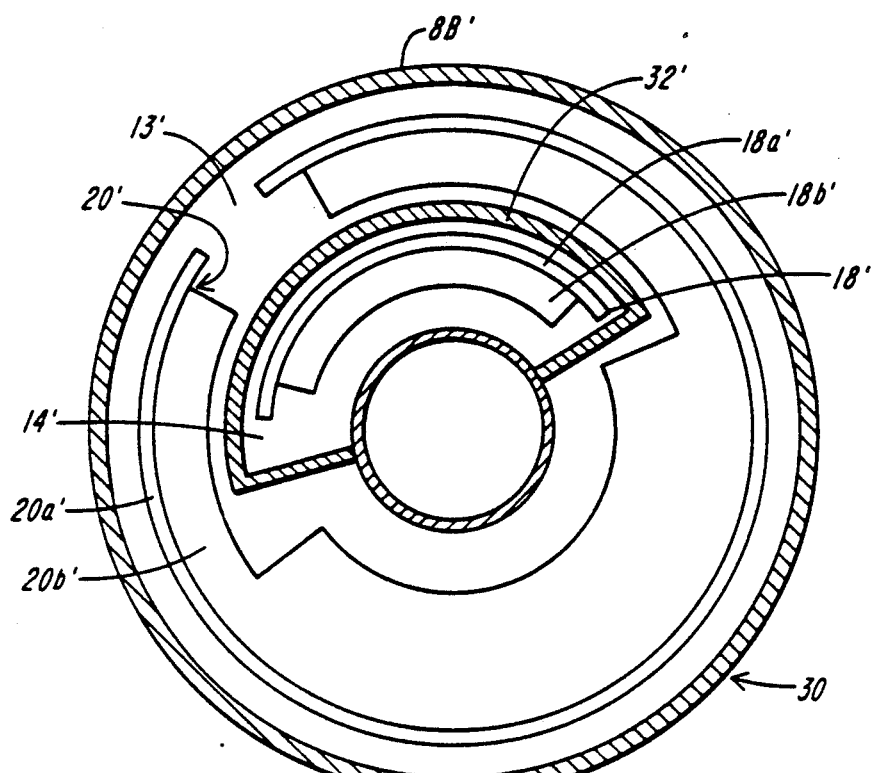
FIG. 4 shows an end view of a prior art power supply.

A prior art toroidally encased power supply 30 is illustrated in FIG. 4 for comparison purposes. Elements in power supply 30 which are compared to elements in the power supply 10 of the invention are indicated by similar, but primed ('), reference designations. In the supply 30, the network 18' is disposed within an isolated compartment established by wall 32. That configuration establishes two interfaces that are not present in the configuration of the present invention, namely, the interface between the encapsulated network 18' and wall 32, and the interface between the encapsulated network 20' and wall 32. Each of these interfaces in supply 30 have deleterious effects on the reliability of the supply 30, as noted above.

Moreover, in the prior art supplies, such as supply 30 the encapsulated networks are generally encapsulated with materials such as Isobond #24 used in conjunction with Hardner #22, and the encasement is typically made of Celenex 3300 manufactured by Celanese Engineering Resin Co., Chatham, N.J., which has been roughened so as to provide a frictional contact between the encapsulated networks and the wall 32 within the encasement 8'. This method of affixing the networks 18' and 20' is relatively unreliable compared with the non-frictional based bonding method for networks 18 and 20 of the present invention.

While the preferred embodiment has been shown and described, various modifications and substitutions may be made thereto without departing from the spirit and scope of the invention. Accordingly, it is to be understood that the present invention has been described by way of illustrations and not limitation.

What is claimed is:

1. A system comprising:
    an encasement including walls which define an interior region; and
    an integer (n) number of networks, where n is larger than one, each of said networks being positioned within said interior region, each of said networks being encapsulated in a substantially electrically non-conductive material, said encapsulation material for said networks being characterized by a non-friction based bonding affinity, wherein one outer surface of at least one of said encapsulated networks is complementary to, adjacent to, and in physical contact with an outer surface of at least one other of said encapsulated networks.

2. The system of claim 1 wherein n is equal to two.

3. The system of claim 2 wherein said system is a power supply, said region is toroidal, and said one encapsulated network is a voltage multiplier network.

4. The power supply of claim 3 wherein said networks are affixed to cylindrical support boards.

5. The system of claim 1 wherein said system is a power supply, said region is toroidal, and said one encapsulated network is a voltage multiplier network.

6. The power supply of claim 5 wherein said networks are affixed to cylindrical support boards.

7. A system housed within an encasement comprising at least two networks,
    said system being constructed by the sequential steps of:
    (a) constructing at least one and not more than n−1 of said networks, where n is an integer greater than 1, including the substep of affixing each of said networks to an associated support board;
    (b) encapsulating at least one but not more than n−1 of said constructed networks in a substantially electrically non-conductive material, said encapsulated networks having at least one lateral surface having a predetermined contour;
    (c) positioning said encapsulated network interior to said encasement;
    (d) at any time prior to step (e) below, constructing the remaining unconstructed ones of said n networks, including the substep of affixing said unconstructed networks to an associated support board, said remaining networks being non-encapsulated networks;
    (e) positioning said non-encapsulated networks adjacent to said encapsulated network and interior to said encasement; and
    (f) encapsulating said non-encapsulated networks in a substantially electrically non-conductive material within said encasement whereby all of said n networks are encapsulated,
    wherein said encapsulating materials are characterized by a non-friction based mutual bonding affinity, and whereby at least one of said encapsulated networks other than said one encapsulated network has at least one lateral surface complementary to, adjacent to, and in physical contact with, said one lateral surface of said one encapsulated network.

8. A power supply comprising a first network and a second network positioned within an encasement,
    said supply being constructed by the sequential steps of:
    (a) constructing said first network including the substep of affixing said first network to an associated board;
    (b) encapsulating said first network and said first board in a substantially electrically non-conductive first material, said encapsulated first network and board having at least one lateral surface having a predetermined contour;
    (c) positioning said encapsulated first network and board interior to said encasement;
    (d) at any time prior to step (e) below, constructing said second network including the substep of affixing said second network to associated board;
    (e) positioning said second network and board in a region interior to said encasement and adjacent to said encapsulated first network and board; and
    (f) encapsulating said second network and board in a substantially electrically non-conductive second material,
    said first and second materials being characterized by a non-friction based mutual bonding affinity, and whereby said encapsulated second network has at least one lateral surface complementary to, adjacent to, and in physical contact with, said one lateral surface of said first encapsulated network.

9. The power supply of claim 8 wherein said boards are cylindrical sections.

10. The power supply of claim 9 wherein said interior region is toroidal.

* * * * *